(12) United States Patent
Laible

(10) Patent No.: US 8,069,878 B2
(45) Date of Patent: Dec. 6, 2011

(54) HAND-HELD DISPENSER

(76) Inventor: Rodney Laible, Omaha, NE (US)

( * ) Notice: Subject to any disclaimer, the term of this patent is extended or adjusted under 35 U.S.C. 154(b) by 430 days.

(21) Appl. No.: 12/378,852

(22) Filed: Feb. 20, 2009

(65) Prior Publication Data
US 2010/0212753 A1  Aug. 26, 2010

(51) Int. Cl.
*B05B 7/30* (2006.01)
(52) U.S. Cl. .................. 137/892; 239/310; 239/318
(58) Field of Classification Search ............ 137/892, 137/888, 590; 239/310, 316, 318, 581.1, 239/407, 413, 414, 417, 315; 222/481, 481.5, 222/482
See application file for complete search history.

(56) References Cited

U.S. PATENT DOCUMENTS

| | | | | | |
|---|---|---|---|---|---|
| 2,388,445 | A | * | 11/1945 | Stewart | 239/318 |
| 3,322,151 | A | * | 5/1967 | Giese et al. | 137/888 |
| 4,854,505 | A | * | 8/1989 | LaVine, Jr. | 137/605 |
| 6,988,675 | B2 | | 1/2006 | Hubmann | |
| 7,237,728 | B1 | | 7/2007 | Laible | |
| 7,296,761 | B1 | | 11/2007 | Laible | |
| 2007/0267519 | A1 | * | 11/2007 | Laible | 239/310 |

* cited by examiner

*Primary Examiner* — Stephen M Hepperle
*Assistant Examiner* — Craig J Price
(74) *Attorney, Agent, or Firm* — Dennis L. Thomte; Thomte Patent Law Office LLC

(57) ABSTRACT

A hand-held dispenser for precisely controlling the flow rate of water therethrough and for injecting a liquid chemical into the water passing through the apparatus.

2 Claims, 6 Drawing Sheets

HAND-HELD DISPENSER

BACKGROUND OF THE INVENTION

1. Field of the Invention

This invention relates to a hand-held dispenser and more particularly to a hand-held dispenser which is convenient to use and which is capable of controlling the flow rate of water therethrough for mixing with a liquid chemical into the water passing through the dispenser.

2. Description of the Related Art

Many types of dispensers have been previously provided which may be connected to the end of a water hose or the like wherein the device introduces chemicals into the water flow so that a lawn or the like may be sprayed. The devices of the prior art are also able to inject liquid chemicals into a water stream so that a mop bucket, etc., may be filled with water, detergent or other chemicals.

In Applicant's earlier U.S. Pat. Nos. 7,237,728 and 7,296,761, hand-held dispensers are disclosed which are able to conveniently and economically precisely control the rate of water flow through the dispenser and to precisely control the metering of liquid chemicals in the precisely controlled flow of water.

Although the dispensers of Applicant's earlier patents have met with considerable success, Applicant has developed an improved hand-held dispenser which is convenient to use which precisely controls the water flow therethrough and the injection of liquid chemicals thereinto.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A hand-held dispenser is described for precisely and conveniently controlling the flow rate of water therethrough so that a liquid chemical or the like may be mixed with the water passing therethrough. The apparatus of this invention comprises a body member which includes a generally horizontally disposed first body portion having first and second sides, an inlet end and a discharge end. The body member also includes a generally vertically disposed second body portion extending downwardly from the first body portion, with the second body portion having a lower end adapted to be secured to a liquid container. The first body portion has a generally horizontally disposed first body member which extends inwardly from the inlet end of the body member towards the discharge end thereof. The first body member has an inlet end and a discharge end and has a horizontally disposed first passageway formed therein which extends from the inlet end towards the discharge end thereof, with the first passageway having an inlet end and a discharge end. The inlet end of the first passageway is adapted to be placed in communication with a source of water under pressure.

The first body portion also has a generally vertically disposed second body member positioned at the discharge end of the first body member with the second body member having upper and lower ends. The second body member has a cylindrical chamber formed therein which has an inlet end and a discharge end. The second body member has an annular valve seat formed therein above its inlet end with the valve seat having an inlet side and a discharge side. The inlet side of the valve seat is in communication with the first passageway with the discharge side of the valve seat being in communication with the cylindrical chamber in the second body member. A vertically movable first valve means is selectively vertically movably mounted in the chamber with the first valve means including a valve member positioned below the valve seat and a valve stem secured to the valve member which extends upwardly therefrom through the valve seat and through a valve guide positioned in the chamber. The first valve means is selectively vertically movable between a lower position to an upper position. The valve member of the first valve means closes the valve seat when the first valve means is in its upper position. The valve member, when the first valve means is in its lower position, permits the flow of water from the first passageway, through the valve seat, and upwardly into the valve guide in the chamber.

A valve actuating lever is pivotally secured to the first body portion which is operatively connected to the upper end of the valve stem. The lever is pivotally movable from an upper "off" position wherein the first valve means is in its upper position to a lower "on" position wherein the first valve means is unseated from the valve seat.

The first body portion also has a horizontally disposed second passageway formed therein which extends from the valve guide in the chamber, above the valve seat towards the discharge end of the first body portion. The first body portion also has a third body member positioned at the downstream side of the second body member. The third body member has a transversely extending spool opening formed therein. The third body portion also has a third passageway formed therein which extends from the spool opening to the second passageway. The third body portion has a fourth passageway extending from the spool opening towards the discharge end of the first body portion. The third and fourth passageways are in alignment with each other. A spool valve is selectively rotatably mounted in the spool opening with the spool valve having at least two passageways formed therein which have different diameters. The spool valve is selectively rotatably so that either of the two passageways therein may be placed in communication with the third and fourth passageways. The first body portion has an elongated fifth passageway extending from the spool opening to the discharge end of the first body portion. The first body portion also has a sixth passageway formed therein which extends downwardly from the fifth passageway to the lower end of the second body portion so as to be in communication with the liquid in the liquid container. The passage of water through the fifth passageway to the discharge end of the first body portion, when the first valve means is in its open position, draws liquid from the liquid container upwardly through the sixth passageway for mixing with the water passing through the fifth passageway.

When the first valve means is in its closed position, the water pressure below the valve member yieldably urges the spring-loaded valve means to its upper closed position. When the first valve means is in its open position, the water pressure above the valve member yieldably maintains the first valve means in its lower open position. The water flow rate through the dispenser may be controlled by rotating the spool valve to its desired position.

It is therefore a principal object of the invention to provide an improved hand-held dispenser.

A further object of the invention is to provide an improved chemical dispenser.

Still another object of the invention is to provide an improved hand-held dispenser which dispenses chemicals mixed with water.

Still another object of the invention is to provide a dispenser of the type described which enables the precise control rate of the flow rate of water therethrough.

Still another object of the invention is to provide a dispenser which is economical of manufacture, durable in use and refined in appearance.

These and other objects will be obvious to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE INVENTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Dispenser 10 includes a dispenser body 12 which is generally T-shaped in configuration and which includes a generally horizontally disposed body portion 14 and a generally vertically disposed body portion 16. Obviously, body portion 14 will not always be horizontally disposed when being used nor will body portion 16 always be substantially vertically disposed when in use.

Figure 1:
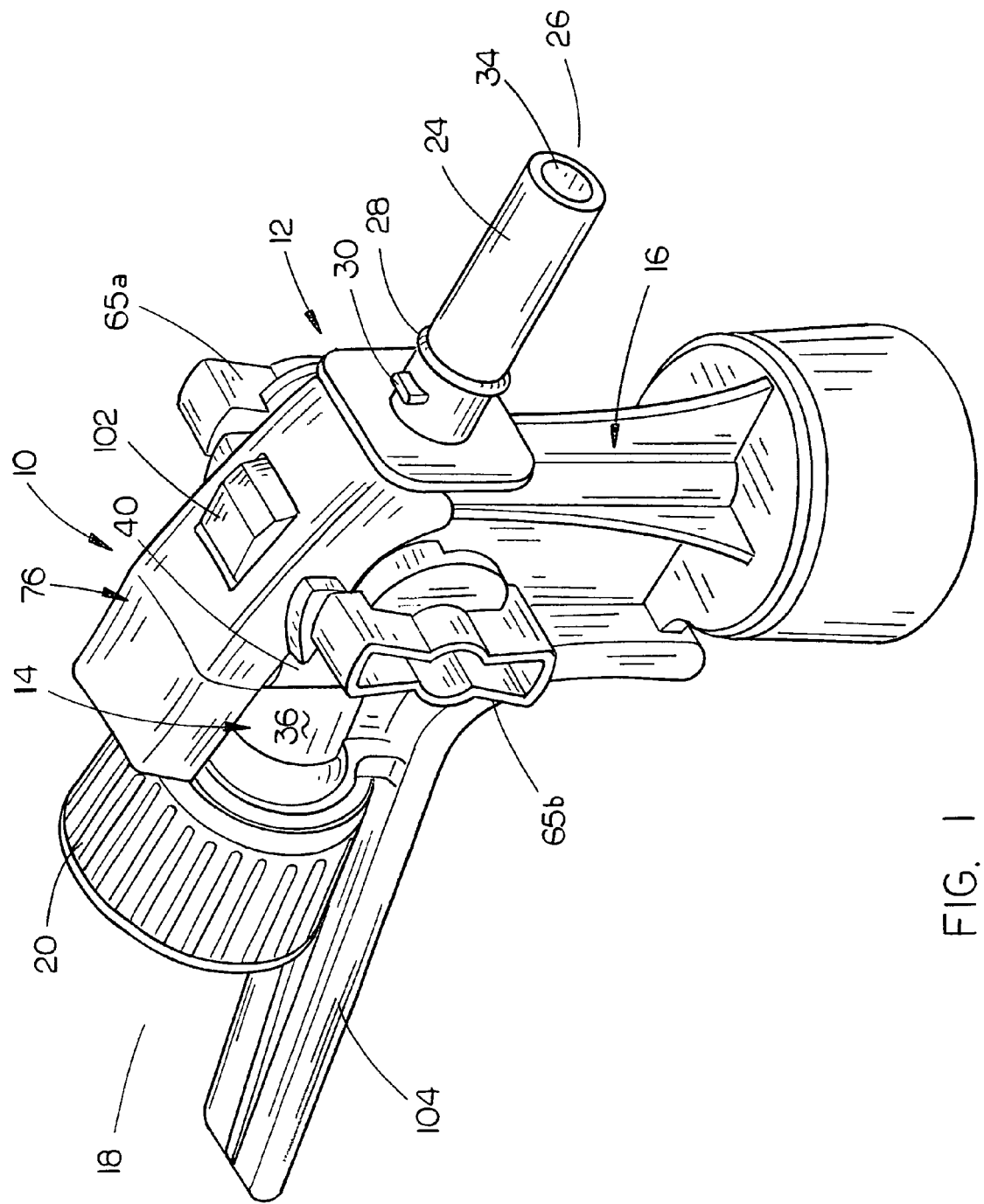
FIG. 1 is perspective view of the hand-held dispenser of this invention.
Figure 2:
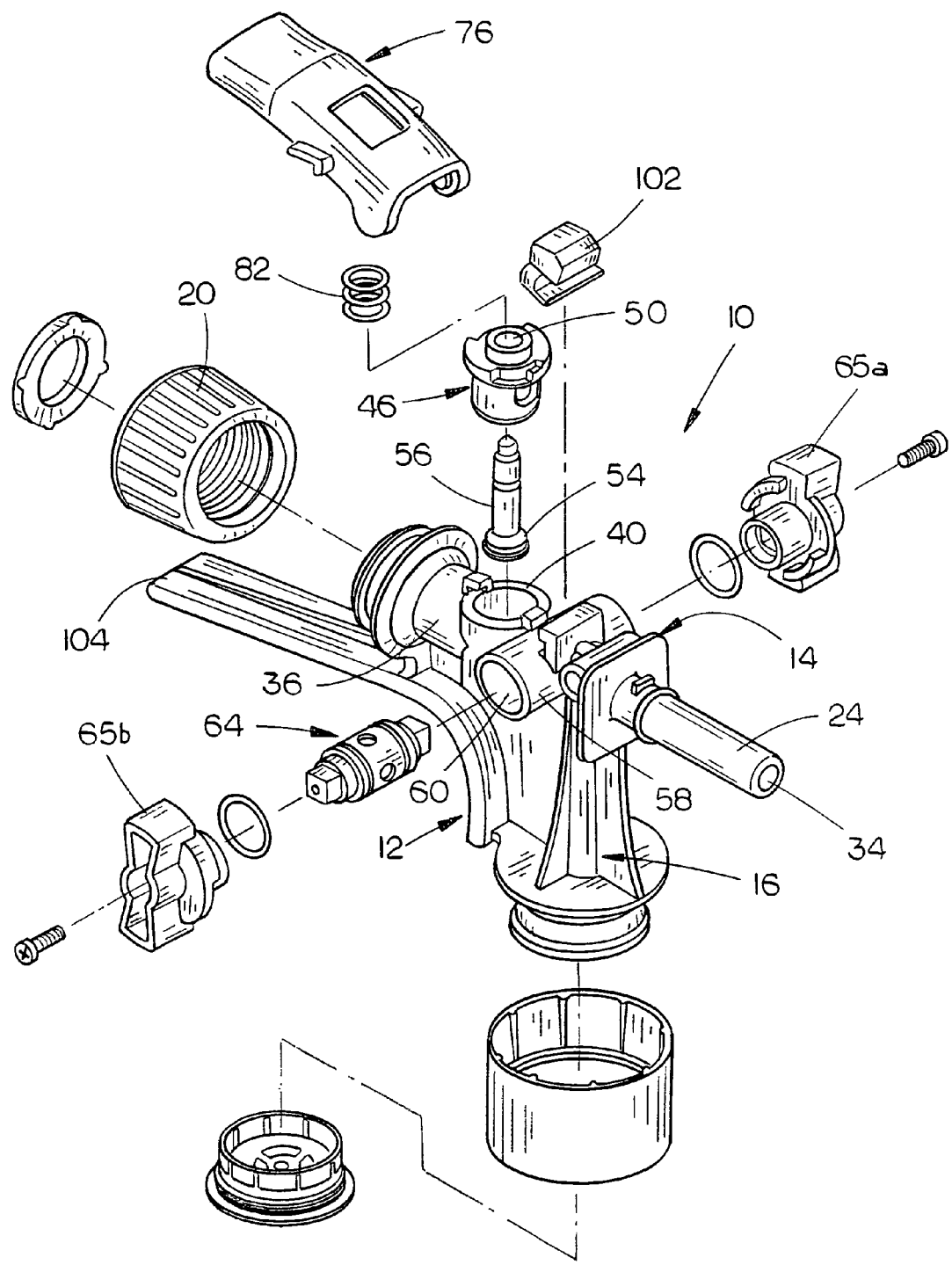
FIG. 2 is an exploded perspective view of the hand-held dispenser of this invention.
Figure 3:
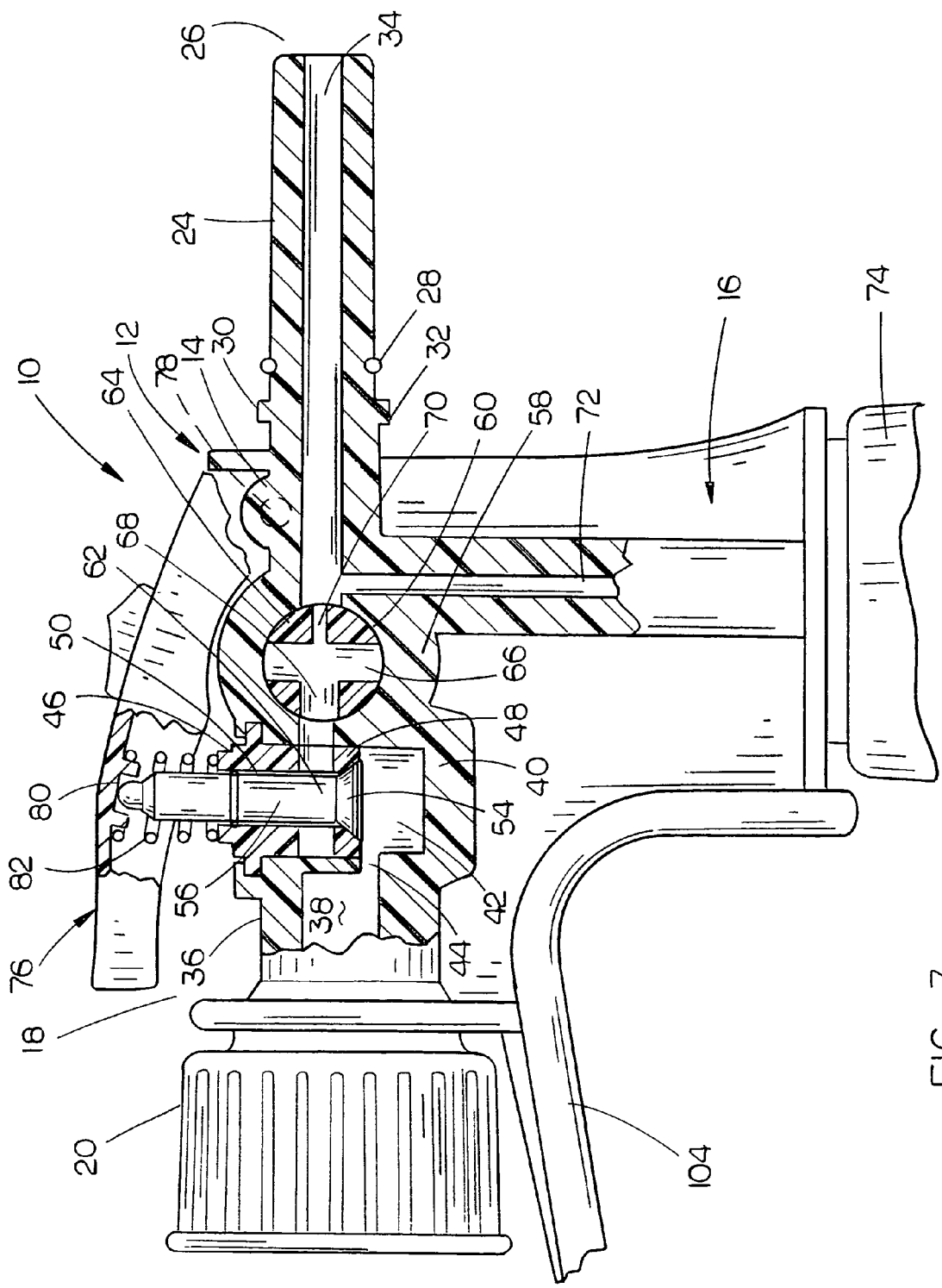
FIG. 3 is a partial sectional view of the hand-held dispenser of this invention.
Figure 4:
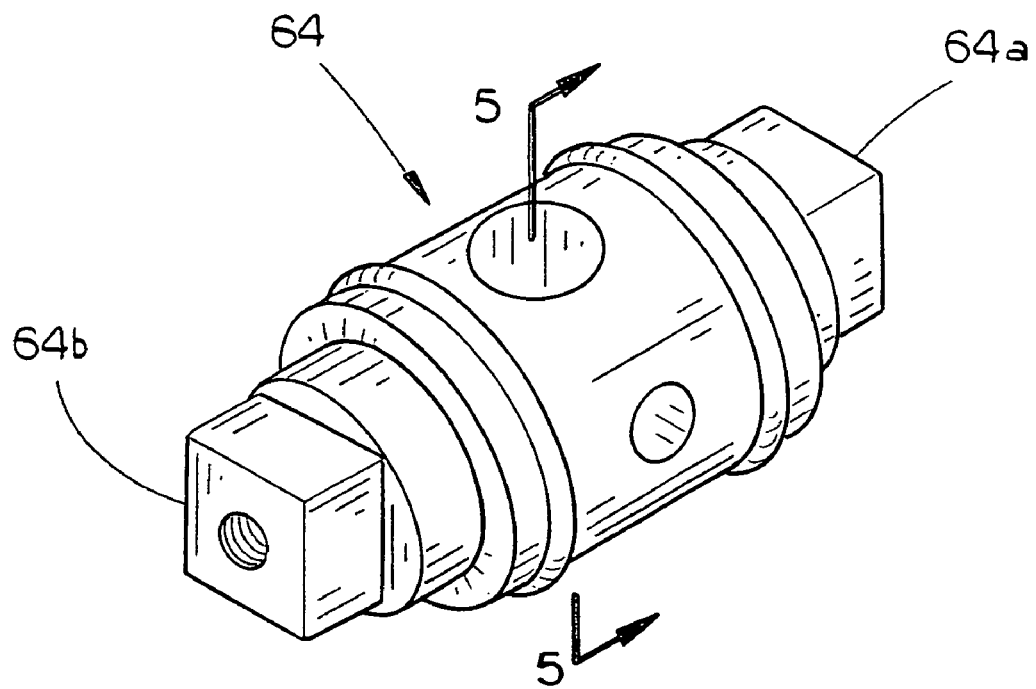
FIG. 4 is a perspective view of the spool valve of this invention.
Figure 5:
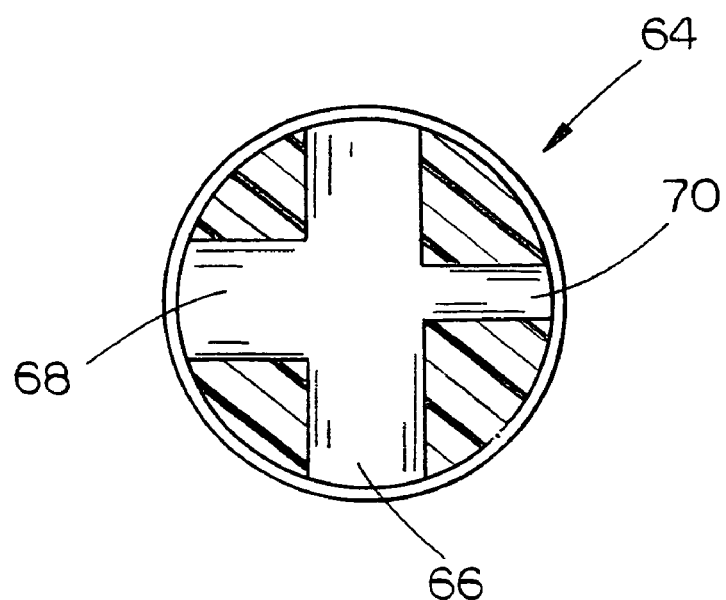
FIG. 5 is a sectional view of the spool valve of FIG. 4.
Figure 6:
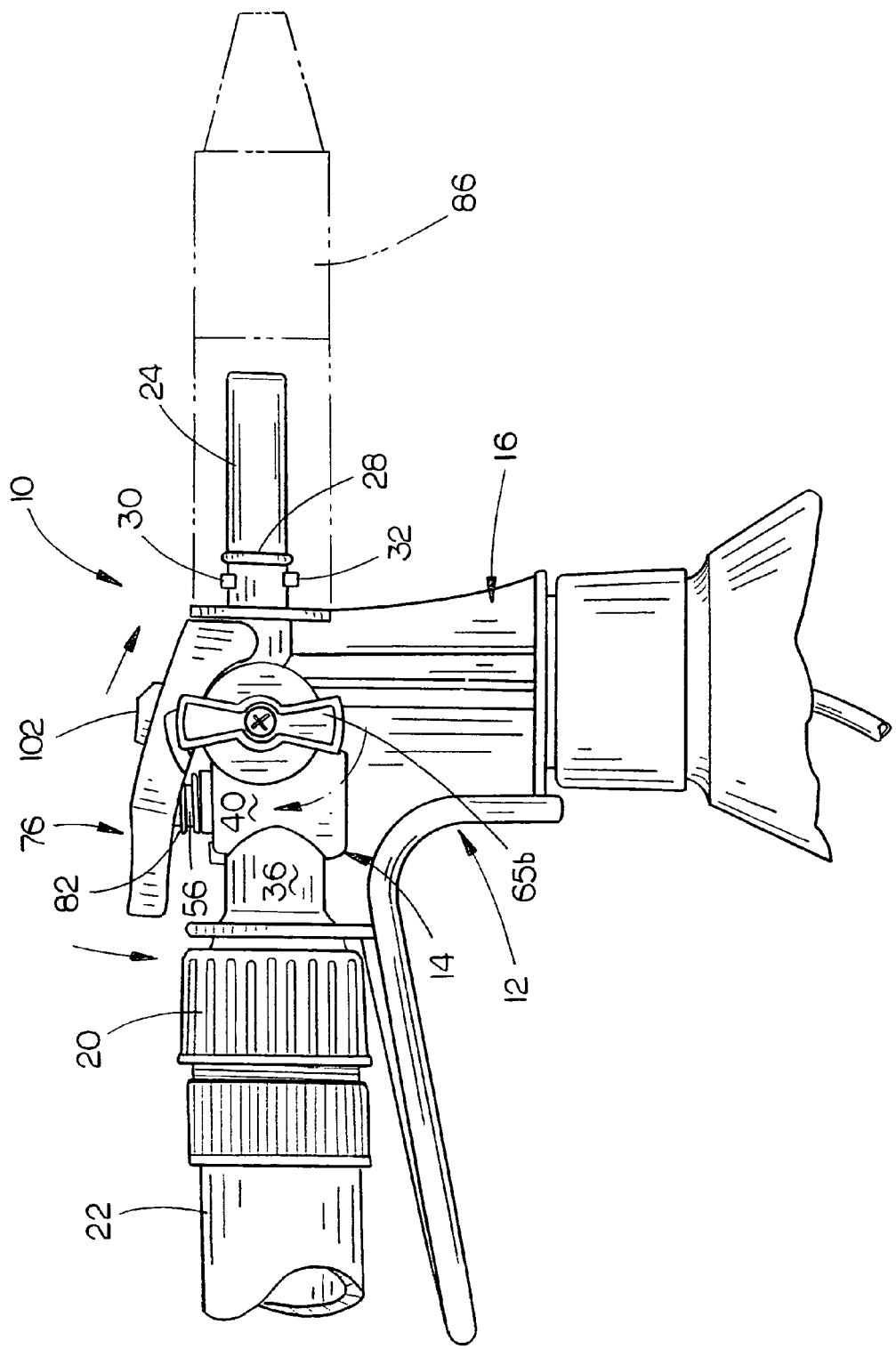
FIG. 6 is a side view of the hand-held dispenser of this invention.

Body portion 14 includes an inlet end 18 which preferably has a rotatable dispenser nut or connector 20 mounted thereon so that a water hose or the like may be secured thereto with the water hose being in communication with a source of water under pressure. It is preferred that a back flow preventer of conventional design be imposed between the water hose 22 and the inlet end 18. An elongated hollow discharge tube 24 is provided at the discharge end 26 of the body portion 14. As will be explained hereinafter, tube 24 may have any type of discharge nozzle selectively removably mounted thereon. A seal ring 28 is mounted on tube 26 as seen in FIG. 1. A pair of oppositely disposed locking lugs 30 and 32 project from tube 26 adjacent the inner end thereof as seen in FIG. 3. Tube 26 has a bore or passageway 34 extending therethrough.

Body portion 14 includes a horizontally disposed cylindrical body member 36 at its inlet 18 which has a bore or passageway 38 extending therethrough. The inner end of body member 36 joins a vertically disposed hollow cylindrical body member 40 having a vertically disposed cylindrical chamber or passageway 42 formed therein. The inner end of bore 38 of body member 36 communicates with a small opening 44 formed in the side wall of body member 40 so that water may flow through passageway 38, through opening 44 and into chamber 42 above the lower end of body member 40. A generally cylindrical valve guide or insert 46 is selectively removably positioned in chamber 42 above the lower end thereof. Valve guide 46 has an annular valve seat 48 formed therein at the lower end thereof which communicates with bore 50 formed in valve guide 46.

The numeral 54 refers to a valve which is designed to seat upon valve seat 48 to close the same. Valve stem 56 extends upwardly from valve 54 and vertically movably extends upwardly through passageway or bore 50 so that the upper end of valve stem 56 is positioned above valve guide 46.

Body portion 14 also includes a transversely extending cylindrical member 58 having a chamber 60 formed therein, with the chamber 60 communicating with chamber 42 by way of passageway 62 and with passageway 34 in discharge tube 24. An elongated, cylindrical spool 64 is selectively rotatably mounted in chamber 60 and includes opposite ends 64a and 64b. Handles or knobs 65a and 65b are secured to the opposite ends 64a and 64b respectively to permit the selective rotation of spool 64. Spool 64 has a first passageway or bore 66 extending therethrough. Spool 64 also has a second passageway or bore 68 formed therein which communicates with bore 66. Spool 64 also has a bore or passageway 70 which is aligned with bore 68 and which communicates with passageway 66. As seen, bores 66 and 68 have the same diameter with bore 70 having a smaller diameter than bores 66 and 68.

Spool 64 may be selectively rotated so that passageway 68 communicates with passageway 62 and so that bore 70 communicates with passageway 34 in tube 26. Spool 64 may also be selectively rotated so that the ends of bore 66 communicate with passageways 62 and 34 to change the flow rate of the dispenser. Other types of spools having various sized bores formed therein may be utilized to vary the flow rate of the dispenser as required. Bore 72 is formed in body portion 16 with its lower end communicating with the interior of a container 74 containing liquid chemicals or the like. As water flows past the upper end of passageway 72, a venturi action is created to draw or suck the liquid from the container 74 into the passageway 34 where it is mixed with the water flowing through passageway 34 and then discharged from tube 34.

The numeral 76 refers to an actuating lever having its forward end pivotally secured to body portion 14 at 78. The underside of lever 76 is connected to the upper end of valve stem 56 at 80 so that pivotal movement of lever 76 will cause valve stem 56 to be vertically moved in response to movement of the lever 76. Spring 82 embraces the upper end of valve stem 56 between the underside of lever 76 and the upper end of valve guide 46 to yieldably maintain the rearward end of lever 76 in its upper "off" position and to maintain valve 54 in seating engagement with valve seat 48 thereby preventing flow of water through the dispenser 10. As the rearward end of the lever is depressed from its upper "off" position, valve stem 56 will be moved downwardly in bore 50 to unseat valve 54 from valve seat 48 so that water will flow through passageway 38, opening 44, into chamber 42 upwardly through valve seat 48, upwardly into passageway 50, through the forward end of passageway 52, through passageway 62, through the selected passageways in spool 64, into passageway 34 and outwardly from tube 26. Dispenser 10 also includes a slide lock 102 which is movably mounted thereon to permit the selective locking of the lever 76 in either its "off" position or its "on" position.

When valve 54 is in its closed position, the pressure of the water therebelow in chamber 42 is exerted upwardly onto the lower end of valve 54 to aid in maintaining the valve 54 in its closed position. When valve 54 is moved downwardly from its closed position, the water pressure against the upper side of the valve 54 aids in maintaining the valve 54 in its open position.

Various types of discharge nozzles may be selectively mounted on the discharge tube 24. For example, a foaming nozzle 86, a spray nozzle 88 or a container filling nozzle 90 may be selectively mounted on discharge tube 24.

Figure 7:
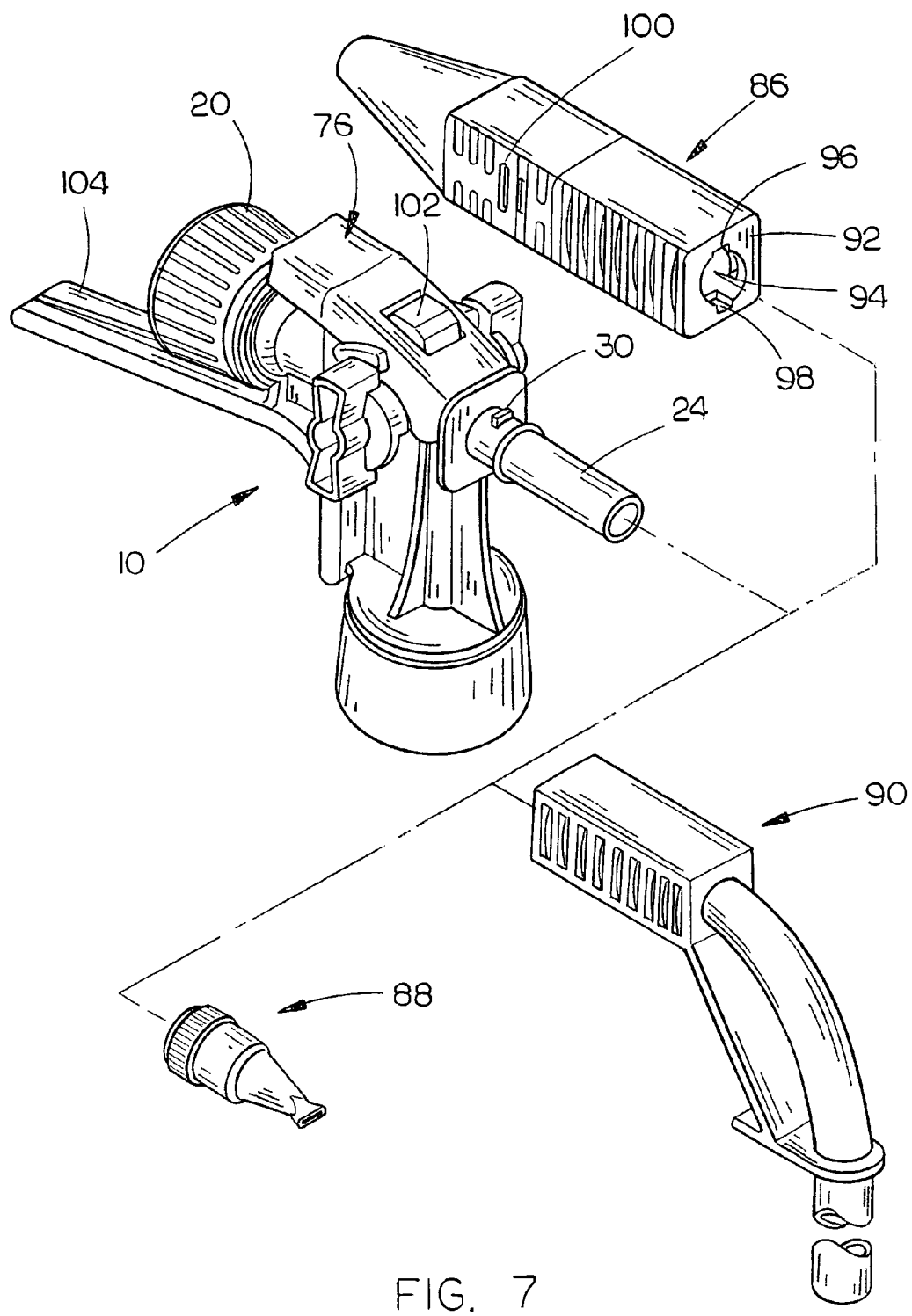
FIG. 7 is a perspective view of the dispenser of this invention together with three different types of nozzles which may be mounted on the discharge tube of the dispenser.

As seen in FIG. 7, the foaming nozzle 84 has a rear wall 92 with an opening 94 formed therein to enable tube 24 to be positioned within the nozzle 86. Opening 94 is provided with a pair of notches 96 and 98 adapted to permit the locking lugs 30 and 32 to be inserted therethrough. Rotation of nozzle 86 causes the nozzle 86 to be selectively locked onto the discharge tube 24. As the water/chemical mixture passes from the outer end of tube 24, which is positioned within nozzle 86, the mixture is mixed with air which is drawn into the nozzle 86 by way of a plurality of openings 100 formed in the body of nozzle 86 which creates a foaming action in the water/chemical mixture being discharged from the discharge end 26 of nozzle 86. The nozzles 88 and 90 may be similarly mounted on tube 24 as desired.

For convenience, dispenser 10 is provided with a handle 104 which may be grasped by the user of the dispenser or which may be clipped onto a water bucket or the like.

Thus, it can be seen that a dispenser has been provided which accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A hand-held dispenser apparatus for controlling the flow rate of water therethrough and for injecting a liquid chemical into the water passing through the apparatus, comprising:
   a body member;
   said body member including a generally horizontally disposed first body portion having first and second sides, an inlet end, and a discharge end;
   said body member also including a generally vertically disposed second body portion extending downwardly from said first body portion;
   said second body portion having a lower end adapted to be secured to a liquid container;
   said first body portion having a generally horizontally disposed first body member which extends inwardly from said inlet end of said body member toward said discharge end thereof;
   said first body member having an inlet end and a discharge end;
   said first body member having a horizontally disposed first passageway formed therein which extends from said inlet end towards said discharge end thereof;
   said first passageway having an inlet end and a discharge end;
   said inlet end of said first fluid passageway adapted to be placed in communication with a source of water under pressure;
   said first body portion having a generally vertically disposed second body member positioned at said discharge end of said first body member with said second body member having upper and lower ends;
   said second body member having a cylindrical chamber formed therein which has an inlet end and a discharge end;
   said second body member having a horizontally disposed annular valve seat molded therein above its said inlet end;
   said valve seat having a lower inlet side and an upper discharge side;
   said lower inlet side of said valve seat being in communication with said first passageway;
   said upper discharge side of said valve seat being in communication with said chamber;
   said lower inlet side of said valve seat having a lamer diameter than the diameter of said upper discharge side of said valve seat;
   a vertically movable first valve means selectively vertically movably mounted in said chamber;
   said first valve means including a valve member and a valve stem secured to said valve member which extends upwardly therefrom through said valve seat and said chamber;
   said valve member of said first valve means having a truncated conical shape;
   said first valve means being vertically movable between a lower position to an upper position;
   said valve member of said first valve means being received by said valve seat to close said valve seat when said first valve means is in its said upper position;
   said valve member when said first valve means is in its said lower position, permitting the flow of water from said first passageway, through said valve seat, and upwardly into said chamber;
   a valve actuating lever pivotally secured to said first body portion which is operatively connected to the upper end of said valve stem;
   said lever being pivotally movable from an upper "off" position wherein said first valve means is in its said upper position to a lower "on" position wherein said valve member is unseated from said valve seat;
   said discharge end of said first passageway being positioned below said lower inlet end of said valve seat so that the water under pressure in said first passageway exerts pressure against the lower end of said valve member of said first valve means when said first valve means is in said upper position to assist in maintaining said first valve means in its said upper position and so that water under pressure in said first passageway exerts pressure against the upper end of said valve member of said first valve means when said first valve means is in said lower position;
   said first body portion having a horizontally disposed second passageway formed therein which extends from said chamber, above said valve seat, towards said discharge end of said first body portion;
   said first body portion having a third body member positioned at the downstream side of said second body member;
   said third body member having a transversely extending spool opening formed therein;

said third body member having a third passageway which extends from said spool opening to said second passageway;

said third body portion having a fourth passageway extending from said spool opening towards said discharge end of said body member;

said third and fourth passageways being in alignment with each other;

a spool valve selectively rotatably mounted in said spool opening;

said spool valve having at least two passageways formed therein which have different diameters;

said spool valve being selectively rotatable so that either of said two passageways therein may be placed in communication with said third and fourth passageways;

said first body portion having an elongated fifth passageway extending from said spool opening to said discharge end of said body member;

said body member having a sixth passageway formed therein which extends downwardly from said fifth passageway to said lower end of said second body portion so as to be in communication with the liquid in the liquid container;

the passage of water through said fifth passageway to said discharge end of said body member, when said first valve means is in its said open position drawing liquid from the liquid container upwardly through said sixth passageway for mixing with the water passing through said fifth passageway.

2. The dispenser of claim 1 wherein said rotatable spool has opposite ends and wherein a handle is secured to each end of said spool.

* * * * *